United States Patent [19]

Campbell et al.

[11] 4,221,681

[45] Sep. 9, 1980

[54] METHOD OF FORMING GRAFT COPOLYMERS BY ATTACHING PRE-POLYMERIZED SIDE CHAINS TO A NATURAL OR UNSATURATED SYNTHETIC RUBBER BACKBONE, AND THE RESULTING GRAFT COPOLYMERS

[75] Inventors: David S. Campbell, Welwyn; David E. Loeber; Andrew J. Tinker, both of Hertford, all of England

[73] Assignee: The Malaysian Rubber Producers' Research Association, Hertford, England

[21] Appl. No.: 927,905

[22] Filed: Jul. 25, 1978

[30] Foreign Application Priority Data

Jul. 26, 1977 [GB] United Kingdom ............... 31375/77

[51] Int. Cl.$^3$ ............................................ C08G 81/02
[52] U.S. Cl. .................................. 260/4 AR; 525/194; 525/232; 525/376
[58] Field of Search .................... 260/4 AR, 879, 892, 260/894, 880 R; 525/194, 232

[56] References Cited

U.S. PATENT DOCUMENTS

| | | | |
|---|---|---|---|
| 3,213,159 | 10/1965 | Adomaitis | 260/880 R |
| 3,475,514 | 10/1969 | Nemphos et al. | 260/880 R |
| 3,591,658 | 7/1971 | Onishi et al. | 260/880 R |
| 3,592,878 | 7/1971 | Kromolicki | 260/880 R |
| 3,629,370 | 12/1971 | Ott et al. | 260/879 |
| 3,806,557 | 4/1974 | Halasa | 260/880 R |
| 3,890,294 | 6/1975 | Sheppard | 260/880 R |
| 4,107,109 | 8/1978 | Kassal | 260/4 R |
| 4,125,573 | 11/1978 | Kruse | 260/892 X |

FOREIGN PATENT DOCUMENTS 86592 11/1976 Poland .

*Primary Examiner*—Wilbert J. Briggs, Sr.
*Attorney, Agent, or Firm*—Wenderoth, Lind & Ponack

[57] ABSTRACT

Graft copolymers having thermoplastic elastomeric properties are formed by intimately blending together at elevated temperature in the solid state in e.g. an internal mixer (a) an ethylenically unsaturated natural or synthetic rubber and (b) a pre-polymer of a vinyl aromatic monomer having an azodicarboxylate end group reactive towards unsaturated groups of the rubber.

9 Claims, No Drawings

METHOD OF FORMING GRAFT COPOLYMERS BY ATTACHING PRE-POLYMERIZED SIDE CHAINS TO A NATURAL OR UNSATURATED SYNTHETIC RUBBER BACKBONE, AND THE RESULTING GRAFT COPOLYMERS

This invention relates to a method of forming graft copolymers by attaching pre-polymerised side chains to a natural or unsaturated synthetic rubber backbone and to the resulting graft copolymers. A major use for such graft copolymers is thermoplastic rubbers; but other uses also are envisaged, such as for example solvent-based or hot-melt adhesives.

Graft copolymerisation of vinyl monomers onto natural rubber has been extensively studied in the past. The work has resulted in commercial production of materials known as Heveaplus MG which contain natural rubber-methyl methacrylate graft copolymer. Such materials have achieved some commercial success; but this has been limited by the difficulty of controlling the reaction of the methyl methacrylate with the rubber and the properties of the resulting product. The present invention adopts the alternative approach of reacting pre-formed side chains with the rubber molecules and this provides greater control of the structure of the graft copolymer.

More recently there has been rapidly growing commercial interest in a general class of materials known as thermoplastic elastomers. These materials have a range of physical properties varying from the truly elastomeric behaviour of the Kraton styrene-butadienesytrene block copolymers (Shell Chemical Co.) to the flexible plastic properties of the Hytrel polyester-polyether block systems (E. I. DuPont de Nemours). The range of types is continually increasing and their popularity stems largely from the typical combinations of physical properties which are available from directly moulded products without the need for chemical cross-linking and its associated complex mixing and curing cycles.

The importance of microphase separation in relation to the physical properties of block copolymer systems is well established. The copolymer structure has considerable influence on how this phase separation takes place and hence plays a primary role in determining the physical properties. It has been shown that physical properties comparable to those of such block copolymers can be obtained by graft polymerisation of a glassy pre-polymer onto a rubbery backbone, provided the relative molecular weights of the hard and soft polymers are properly chosen. Thermoplastic rubbers of the block copolymer type have previously been prepared in solution. A disadvantage of such techniques is the need to recover the product from the solvent. The method of the present invention avoids this disadvantage.

This invention provides a method of forming a graft copolymer, which method comprises providing a reaction mixture of an ethylenically unsaturated natural or synthetic rubber in the solid state with a prepolymer having one end group reactive towards ethylenically unsaturated groups of the rubber, and maintaining the mixture at an elevated temperature at least equal to the glass transition temperature of the prepolymer but below the decomposition temperature of the rubber with intimate blending of the reactants, whereby the pre-polymer molecules react with and become attached to the rubber molecule backbone.

The preferred chemical reaction for combination of a functionalised pre-polymer with an unsaturated backbone polymer is the 'ene' reaction:

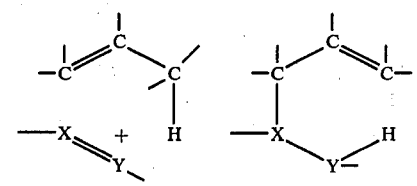

wherein —X=Y may be for example a suitably activated azo group.

An 'ene' reactive group in the form of an azodicarboxylate function can be constructed on the end of a pre-polymer chain as follows:

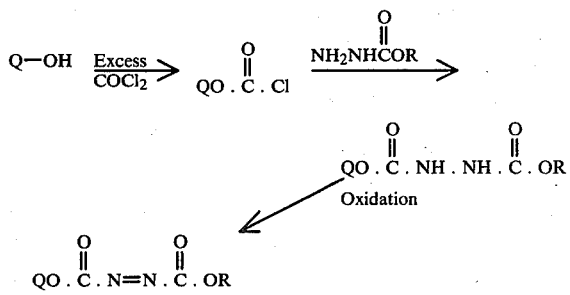

where Q is the pre-polymer and R is $C_1$ to $C_6$ alkyl.

The pre-polymer, apart from its functional end group, does not take part in the reaction. It should be substantially inert to the end group and to the rubber with which it is to be heated. Suitable materials are poly (vinyl aromatic monomers) such as polystyrene, poly(p-t-butylstyrene) or poly (α-methylstyrene).

The invention also provides a graft copolymer prepared as described above having a backbone derived from an ethylenically unsaturated natural or synthetic rubber and side chains of a poly (vinyl aromatic monomer) and having the properties:

| | |
|---|---|
| M 100 (Modulus at 100% extension) | 0.1 to 8 MPa |
| Tensile Strength | 4 to 30 MPa |
| Elongation at Break | more than 200% |

Normally the pre-polymer is a linear molecule with a single functional group at one end of the chain. It is possible, though not preferred, for the pre-polymer to have branched chains. It is also possible, though again not preferred, for a minor proportion of the pre-polymer molecules to have two functional groups; in this case, such molecules will be liable to effect crosslinking in the rubber, but a limited degree of crosslinking may be acceptable for some purposes.

For this reaction it is essential to use natural rubber or a highly unsaturated synthetic rubber. Suitable rubbers include styrene-butadiene copolymers, acrylonitrile-butadiene copolymers, polyisoprene, polybutadiene, and polychloroprene. The reaction is not effective with materials having a saturated carbon backbone, nor even with hydrocarbon rubbers of low unsaturation level. The molecular weight of the rubber is not critical. Natural and unsaturated synthetic rubbers generally have a molecular weight of from 70,000 to 300,000 after solid state compounding such as is required for performing the method of this invention.

For block and graft copolymers which are thermoplastic rubbers, the glass transition temperature of the hard component is important, for the rubbery properties are predominant below that glass transition temperature and the plastic properties above it. In the preparation of materials that are to be used ad thermoplastic rubbers at ambient temperature, it is accordingly necessary that the prepolymer should have a glass transition temperature above ambient and preferably of at least 60° C. An upper limit of about 220° C. is placed on the glass transition temperature by the fact that the reaction temperature of the prepolymer with the rubber has to be at least as high as the glass transition temperature and most unsaturated rubbers begin to decompose around 200°-220° C. In the present invention the molecular weight range of the polystyrene gives a range of glass transition temperatures from 70° to 95° C.

The number average molecular weight of the prepolymer should preferably be in the range 500-50,000, particularly 3,000-15,000. Molecular weights in this range are sufficiently high to achieve the advantageous properties resulting from phase separation in the graft copolymer and no further advantage is gained by using polystyrene having a molecular weight above 20,000. Polystyrene may be conveniently prepared in a narrow molecular weight range by anionic polymerisation; this technique is much easier to use at lower pre-polymer molecular weights, because the viscosity of the system increases very much as the molecular weight rises. If the polystyrene is prepared by emulsion polymerisation, viscosity considerations do not arise to the same extent. But at molecular weights above 20,000, it becomes progressively more difficult to purify and characterise the product, and so more difficult to control the properties of the graft copolymer.

In the preparation of thermoplastic rubbers, it is necessary that the pre-polymer should be incompatible with the rubber. Compatibility for this purpose may be determined by forming an intimate blend of the two polymers; if the blend shows two separate glass transition temperatures, then the two polymers are incompatible. Of course, if the graft copolymer is not intended for use as a thermoplastic rubber, then it is not essential that the pre-polymer be incompatible with the backbone-forming rubber, nor is it essential that the prepolymer have a glass transition temperature above 60° C.

The method by which the functionalised pre-polymer is prepared is not critical to this invention.

Polystyrene carrying a hydroxyl group at one end only of each molecular chain can be conveniently prepared by anionic polymerisation of styrene in solution using n-butyl lithium in the presence of tetramethyl ethylene-diamine (TMEDA) as an initiating system and ethylene oxide followed by acid for chain termination.

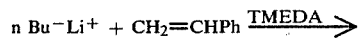

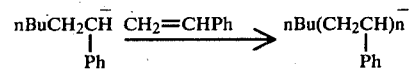

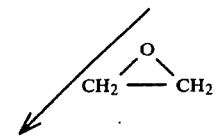

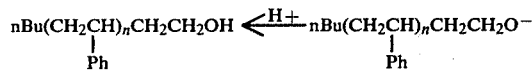

Any other appropriate procedure for producing polymers with one end only of each chain carrying a hydroxyl group or other group forming part of the synthetic schemes outlined above may be used e.g. emulsion polymerisation in the presence of a chain transfer agent carrying the appropriate functional group.

The reaction mixture preferably contains from 40-90% by weight of the rubber and correspondingly from 60-10% by weight of the pre-polymer, on the weight of the two reactants. While it is perfectly possible to make graft copolymers containing more than 60% by weight of the pre-polymer side chains, the properties of such products may not differ significantly from those of materials obtained by more accessible routes. Graft copolymers containing less than 10% by weight of side chains have properties not very different from those of the unmodified rubber. We prefer to use reaction mixes containing from 15-55%, particularly from 25-45%, by weight of the pre-polymer. It is possible, though not necessary, to include other materials in the initial reaction mixture. Thus it is possible, though not preferred, to include a minor proportion of water or organic liquid as a solvent or dispersant. Since the reaction appears to be auto catalytic, it may be advantageous to include in the initial reaction mix a proportion of the desired graft copolymer. If the resulting graft copolymer is to be used in a compounded state, it will often be convenient to incorporate the compounding ingredients in the reaction mixture during or even before reaction.

Very intimate mixing of the reactants during at least a part of the reaction is essential. If the reactants are blended under low shear conditions near ambient temperature and then heated under static conditions efficient grafting does not take place. Mixing under high shear conditions should be continued for at least 30% and preferably more than 60% of the reaction. Provided the reaction has been allowed to proceed under high shear conditions for part of the reaction time subsequent high temperature handling, e.g. compression moulding, injection moulding or extrusion, can increase the extent of the reaction.

The grafting reaction takes place in the type of internal mixing machine normally used for compounding of rubber prior to vulcanization. For experimental work, use has been made of the mixing ability of the Hampden - Shawbury Torque Rheometer, which consists of a pair of contra-rotating paddles within a heated cavity, the paddles being driven by an electric motor mounted in a torque-sensitive mounting. For larger scale operation, an internal mixer such as a Banbury mixer is suitable.

The temperature conditions of mixing are such that the initial cavity temperature is approximately equal to or in excess of the glass transition temperature of the pre-polymer. The work expended on mixing results in a subsequent rise in temperature, the amount of temperature rise depending to some extent on the composition of the mixture and on mixing severity.

The severity of mixing is not readily defined without specific reference to the particular machine being used. In general, the mixing severity is comparable to that required to give carbon black reinforcement in conventional rubber mixing. Unnecessarily high mixing severity can lead to a decrease in tensile strength and modulus in the product.

The preferred time of mixing is such as to result in substantially complete reaction of the functional groups of pre-polymer. Mixing times of 2-30, preferably 5-20, minutes are generally sufficient. Disappearance of azo functional groups can, in many cases, be assessed by infra-red spectroscopic measurements on thin pressed films. The azodicarboxylate group has a characteristic carbonyl absorption at 1785 cm$^{-1}$ which disappears on reaction.

The grafting efficiency can be measured by gel permeation chromatography, whereby pre-polymer which has become chemically bound to the rubber backbone can be distinguished from pre-polymer which has not reacted.

The reaction efficiency depends, not only on the temperature and mixing conditions, but also on the impurities present in the reactants. Synthetic cis-polyisoprene can be provided in a relatively clean state, and can accordingly be caused to react with the pre-polymer at high efficiency. The reaction with natural rubber is generally somewhat less efficient. Reaction efficiencies of from 40 to 100% are typical, based on the azodicarboxylate contents of the pre-polymers. Because of cumulative inefficiencies in the synthetic procedures, the pre-polymer does not have a functional group at the end of every chain and there is always a portion of the pre-polymer sample which is incapable of chemical combination with the rubber backbone. Overall grafting efficiencies are defined as the percentage of the total pre-polymer charge which becomes chemically bound to the rubber backbone in the course of the reaction. Grafting efficiencies are in the range 10–80%, in most cases, better than 30%. It is surprising that reaction between two incompatible polymers should take place at all under these conditions.

As previously stated, many of the products of this invention have properties which make them valuable for use, either as such or compounded with fillers, stabilisers, pigments etc., as thermoplastic rubbers. The products are useful without vulcanization because the pre-polymer side chain domains acts as crosslinks and filler particles. They may be used for example as hot melt adhesives, solution adhesives, or for injection moulding, compression moulding or extrusion. The use of stable pre-polymers which can be isolated and characterised makes it very easy to control the reaction with the rubber so as to obtain desired properties in the graft copolymers.

The following examples illustrate the invention.

EXAMPLE 1

Natural rubber, SMR5L (19.5 g), and polystyrene of number average molecular weight ($\overline{M}n$) 3200 having 79% of the polymer chains terminated with azodicarboxylate functional groups (10.5 g) were added to a small internal mixer heated to 90° C. Mixing was carried out at 150 r.p.m. for 10 min. to give a final mix temperature of 140° C. As the reaction proceeded the initially opaque reaction mixture gradually became transparent. A sample of the product (5.6 g) was pressed at 150° C. for approximately 5 sec. to give a sheet approximately 0.5 mm thick. The sheet was cut into pieces and the sample again pressed into a coherent sheet under the same conditions. The same sample was then formed into a sheet 100×100×0.5 mm by compression moulding at 150° C. for 45 sec. Standard tensile test dumbells (BS 903 Part A2, Type C) were cut from the sheet and tested at an extension rate of 500 mm/min. at 23° C. Analysis of the reaction mixture by gel permeation chromatography showed that the overall grafting efficiency (i.e. the proportion of the total added polystyrene which became chemically bound to the rubber backbone) was 66%.

In the same way, products were prepared with different proportions of the natural rubber and of the polystyrene. These preparations are summarised in Table I.

Table I

| Graft copolymers of SMR5L natural rubber and polystyrene of $\overline{M}n$ 3200 | | | |
|---|---|---|---|
| Polystyrene content (% w/w) | 25 | 30 | 35 |
| Final mix temperature (°C.) | 143 | 145 | 140 |
| Grafting efficiency (%) | 62 | 68 | 66 |
| M100 (MPa) | 0.64 | 0.71 | 1.19 |
| M300 (MPa) | 1.16 | 1.40 | 2.17 |
| M500 (MPa) | 3.21 | 4.35 | 2.24 |
| Tensile strength (MPa) | 15.2 | 17.4 | 19.5 |
| Elongation at break (%) | 828 | 803 | 715 |

EXAMPLE 2

As for Example 1, with polystyrene of $\overline{M}n$ 5450 having 75% of the polymer chains terminated with azodicarboxylate functional groups. These preparations are summarised in Table II.

Table II

| Graft copolymers of SMR5L natural rubber and polystyrene of $\overline{M}n$ 5450 | | | | | | | |
|---|---|---|---|---|---|---|---|
| Polystyrene content (% w/w) | 20 | 25 | 30 | 35 | 40 | 45 | 50 |
| Final mix temperature (°C.) | 140 | 132 | 140 | 135 | 136 | 134 | 132 |
| Grafting efficiency (%) | 41 | 44 | 48 | 52 | 55 | 58 | 60 |
| M100 (MPa) | 0.48 | 0.62 | 0.96 | 1.56 | 2.25 | 3.50 | 5.15 |
| M300 (MPa) | 1.23 | 2.19 | 3.67 | 5.87 | 7.58 | 9.35 | 9.74 |
| M500 (MPa) | 4.49 | 8.00 | 13.2 | 17.4 | 19.8 | 22.0 | 20.5 |
| Tensile strength (MPa) | 10.2 | 14.4 | 19.1 | 23.8 | 22.0 | 24.4 | 21.1 |
| Elongation at break (%) | 700 | 634 | 587 | 581 | 533 | 541 | 504 |

EXAMPLE 3

As for Example 1, with polystyrene of $\overline{M}n$ 8200 having 72% of the polymer chains terminated with azodicarboxylate functional groups. These preparations are summarised in Table III.

Table III

| Graft copolymers of SMR5L natural rubber and polystyrene of $\overline{M}n$ 8200 | | | | | | | | |
|---|---|---|---|---|---|---|---|---|
| Polystyrene content (% w/w) | 20 | 25 | 30 | 35 | 40 | 45 | 50 | 55 |
| Final mix temperature (°C.) | 150 | 155 | 145 | 138 | 138 | 139 | 140 | 144 |

Table III-continued

Graft copolymers of SMR5L natural rubber and polystyrene of $\overline{M}n$ 8200

| Grafting efficiency (%) | 27 | 38 | 39 | 45 | 48 | 55 | 55 | 60 |
|---|---|---|---|---|---|---|---|---|
| M100 (MPa) | 0.30 | 0.55 | 0.97 | 1.59 | 3.06 | 4.22 | 6.84 | 9.33 |
| M300 (MPa) | 0.53 | 1.46 | 3.57 | 5.91 | 9.28 | 9.77 | 10.3 | 9.63 |
| M500 (MPa) | 1.71 | 5.56 | 11.7 | 16.6 | 21.9 | — | 20.7 | — |
| Tensile strength (MPa) | 7.51 | 11.2 | 17.9 | 18.6 | 23.4 | 19.0 | 21.9 | 14.3 |
| Elongation at break (%) | 796 | 651 | 586 | 546 | 524 | 477 | 501 | 389 |

EXAMPLE 4

As for Example 1, with polystyrene of $\overline{M}n$ 8900 having 77% of the polymer chains terminated with azodicarboxylate functional groups. These preparations are summarised in Table IV.

Table IV

Graft copolymers of SMR5L natural rubber and polystyrene of $\overline{M}n$ 8900

| Polystyrene content (% w/w) | 20 | 25 | 30 | 35 | 40 | 45 | 50 | 55 |
|---|---|---|---|---|---|---|---|---|
| Final mix temperature (°C) | 149 | 148 | 145 | 147 | 147 | 138 | 143 | 155 |
| Grafting efficiency (%) | 26 | 28 | 37 | 41 | 45 | 49 | 57 | 61 |
| M100 (MPa) | 0.21 | 0.39 | 0.67 | 1.27 | 2.33 | 3.63 | 5.71 | 7.74 |
| M300 (MPa) | 0.58 | 1.79 | 3.05 | 5.82 | 7.70 | 8.86 | 8.25 | 8.00 |
| M500 (MPa) | 2.06 | 6.68 | 10.2 | 16.2 | 18.6 | 18.2 | 16.5 | — |
| Tensile strength (MPa) | 4.92 | 12.4 | 14.2 | 18.3 | 21.1 | 18.8 | 17.0 | 9.04 |
| Elongation at break (%) | 642 | 668 | 593 | 547 | 551 | 512 | 500 | 309 |

EXAMPLE 5

As for Example 1, with polystyrene of $\overline{M}n$ 12700 having 63% of the polymer chains terminated with azodicarboxylate functional groups. These preparations are summarised in Table V.

Table V

Graft copolymers of SMR5L natural rubber and polystyrene of $\overline{M}n$ 12700

| Polystyrene content (% w/w) | 20 | 25 | 30 | 35 | 40 | 45 | 50 | 55 |
|---|---|---|---|---|---|---|---|---|
| Final mix temperature (°C) | 144 | 147 | 142 | 146 | 143 | 141 | 142 | 146 |
| Grafting efficiency (%) | 19 | 20 | 21 | 23 | 25 | 27 | 30 | 36 |
| M100 (MPa) | 0.33 | 0.38 | 0.50 | 0.73 | 1.43 | 3.06 | 4.47 | 7.16 |
| M300 (MPa) | 0.49 | 0.92 | 1.84 | 3.49 | 6.00 | 9.89 | 10.3 | 9.21 |
| M500 (MPa) | 1.34 | 3.08 | 5.79 | 10.5 | 13.1 | — | — | — |
| Tensile strength (MPa) | 2.46 | 8.05 | 10.1 | 14.1 | 13.7 | 16.4 | 16.2 | 12.3 |
| Elongation at break (%) | 632 | 702 | 631 | 612 | 502 | 435 | 443 | 420 |

EXAMPLE 6

As for Example 1, with polystyrene of $\overline{M}n$ 17700 having 68% of the polymer chains terminated with azodicarboxylate functional groups. The mixing conditions were altered to 6 min. at 150 r.p.m. with an initial mixer temperature of 130° C. These conditions gave better grafting efficiencies than the standard conditions of Example 1 for polystyrene of this molecular weight. These preparations are summarised in Table VI.

Table VI

Graft copolymers of SMR5L natural rubber with polystyrene of $\overline{M}n$ 17700

| Polystyrene content (% w/w) | 20 | 25 | 30 | 35 | 40 | 45 | 50 | 55 |
|---|---|---|---|---|---|---|---|---|
| Final mix temperature (°C) | 168 | 170 | 163 | 167 | 165 | 162 | 164 | 164 |
| Grafting efficiency (%) | 14 | 16 | 18 | 19 | 18 | 21 | 26 | 28 |
| M100 (MPa) | 0.36 | 0.85 | 0.94 | 1.89 | 2.63 | 4.34 | 5.71 | 5.56 |
| M300 (MPa) | 0.96 | 2.84 | 2.77 | 6.14 | 7.78 | 10.9 | — | — |
| M500 (MPa) | 2.27 | 5.82 | 5.43 | 10.3 | — | — | — | — |
| Tensile strength (MPa) | 2.83 | 6.26 | 5.72 | 11.3 | 11.2 | 12.2 | 10.1 | 6.65 |
| Elongation at break (%) | 575 | 526 | 517 | 500 | 402 | 352 | 275 | 237 |

EXAMPLE 7

As for Example 3 using SMR10 natural rubber instead of SMR5L. The polystyrene content of the mix was 40% by weight. The preparation is summarised in Table VII.

EXAMPLE 8

As for Example 7, using SMR20 natural rubber instead of SMR10. The preparation is summarised in Table VII.

EXAMPLE 9

As for Example 7, using SMR5CV natural rubber instead of SMR10. The preparation is summarised in Table VII.

EXAMPLE 10

As for Example 7, using RSS1 natural rubber instead of SMR10. The preparation is summarised in Table VII.

Table VIII

Graft copolymers of different grades of natural rubber with polystyrene of $\overline{M}n$ 8200

| Natural rubber grade | SMR10 | SMR20 | SMR5CW | RSS1 |
|---|---|---|---|---|
| Final mix temperature | 147 | 150 | 148 | 146 |
| Grafting efficiency (%) | 47 | 34 | 32 | 10 |
| M100 (MPa) | 2.49 | 2.33 | 2.54 | 1.54 |
| M300 (MPa) | 7.26 | 9.39 | 9.05 | 3.70 |
| M500 (MPa) | — | — | 21.4 | — |
| Tensile strength (MPa) | 17.7 | 16.8 | 20.9 | 6.96 |
| Elongation at break (%) | 493 | 414 | 502 | 462 |

EXAMPLE 11

As for Example 1, using Cariflex IR305 synthetic polyisoprene instead of natural rubber. These preparations are summarised in Table VIII.

Table VIII

Graft copolymers of Cariflex IR305 polyisoprene with polystyrene of $\overline{M}n$ 3200

| Polystyrene content (% w/w) | 25 | 30 | 35 | 40 |
|---|---|---|---|---|
| Final mix temperature (°C) | 135 | 139 | 139 | 138 |

Table VIII-continued

Graft copolymers of Cariflex IR305 polyisoprene with polystyrene of $\overline{M}n$ 3200

| Grafting efficiency (%) | 81 | 81 | 79 | 81 |
|---|---|---|---|---|
| M100 (MPa) | 0.53 | 0.85 | 1.17 | 1.46 |
| M300 (MPa) | 0.83 | 1.28 | 1.72 | 2.13 |
| M500 (MPa) | 1.20 | 2.61 | 2.61 | 3.49 |
| Tensile strength (MPa) | 7.48 | 11.5 | 11.3 | 12.9 |
| Elongation at break (%) | 1106 | 1063 | 960 | 880 |

EXAMPLE 12

As for Example 2, using Cariflex IR305 synthetic polyisoprene instead of natural rubber. These preparations are summarised in Table IX.

Table IX

Graft copolymers of Cariflex IR305 polyisoprene with polystyrene of $\overline{M}n$ 5450

| Polystyrene content (% w/w) | 20 | 25 | 30 | 35 | 40 | 45 | 50 |
|---|---|---|---|---|---|---|---|
| Final mix temperature (°C) | 135 | 135 | 135 | 136 | 130 | 134 | 132 |
| Grafting efficiency (%) | 76 | 74 | 73 | 76 | 74 | 75 | 75 |
| M100 (MPa) | 0.32 | 0.40 | 0.95 | 1.47 | 2.43 | 3.46 | 4.54 |
| M300 (MPa) | 0.77 | 1.00 | 2.05 | 3.01 | 4.46 | 5.77 | 6.66 |
| M500 (MPa) | 1.59 | 1.86 | 4.17 | 6.12 | 8.45 | 10.5 | 11.7 |
| Tensile strength (MPa) | 8.26 | 5.24 | 12.9 | 15.8 | 15.3 | 17.5 | 17.8 |
| Elongation at break (%) | 1176 | 1011 | 932 | 878 | 770 | 771 | 705 |

EXAMPLE 13

As for Example 3, using Cariflex IR305 synthetic polyisoprene instead of natural rubber. These preparations are summarised in Table X.

Table X

Graft copolymers of Cariflex IR305 polyisoprene with polystyrene of $\overline{M}n$ 8200

| Polystyrene content (% w/w) | 20 | 25 | 30 | 35 | 40 | 45 | 50 | 55 |
|---|---|---|---|---|---|---|---|---|
| Final mix temperature (°C) | 148 | 147 | 151 | 144 | 152 | 143 | 141 | 138 |
| Grafting efficiency (%) | 77 | 77 | 77 | 76 | 77 | 77 | 76 | 76 |
| M100 (MPa) | 0.32 | 0.57 | 1.13 | 1.49 | 2.43 | 3.26 | 4.54 | 6.82 |
| M300 (MPa) | 0.93 | 1.34 | 2.53 | 2.69 | 5.08 | 5.24 | 5.93 | 6.92 |
| M500 (MPa) | 2.08 | 2.89 | 5.24 | 5.19 | 9.02 | 9.59 | 10.6 | 11.8 |
| Tensile strength (MPa) | 6.75 | 8.23 | 12.3 | 12.0 | 14.5 | 15.2 | 16.0 | 12.1 |
| Elongation at break (%) | 1001 | 914 | 871 | 828 | 729 | 720 | 680 | 527 |

EXAMPLE 14

As for Example 4, using Cariflex IR305 synthetic polyisoprene instead of natural rubber. These preparations are summarised in Table XI.

Table XI

Graft copolymers of Cariflex IR305 polyisoprene with polystyrene of $\overline{M}n$ 8900

| Polystyrene content (% w/w) | 20 | 25 | 30 | 35 | 40 | 45 | 50 | 55 |
|---|---|---|---|---|---|---|---|---|
| Final mix temperature (°C) | 140 | 136 | 144 | 146 | 144 | 140 | 138 | 140 |
| Grafting efficiency (%) | 76 | 74 | 74 | 75 | 74 | 74 | 74 | 74 |
| M100 (MPa) | 0.22 | 0.55 | 1.08 | 1.61 | 2.68 | 4.20 | 5.71 | 7.94 |
| M300 (MPa) | 0.82 | 1.45 | 2.45 | 2.95 | 4.17 | 4.96 | 6.09 | 8.20 |
| M500 (MPa) | 1.84 | 2.97 | 4.71 | 5.50 | 7.35 | 8.61 | 9.49 | — |
| Tensile strength (MPa) | 4.24 | 6.74 | 8.80 | 10.9 | 11.6 | 12.7 | 10.4 | 8.24 |
| Elongation at break (%) | 866 | 893 | 799 | 806 | 737 | 704 | 538 | 466 |

EXAMPLE 15

As for Example 5, using Cariflex IR305 synthetic polyisoprene instead of natural rubber. These preparations are summarised in Table XII.

Table XII

Graft copolymers of Cariflex IR305 polyisoprene with polystyrene of $\overline{M}n$ 12700

| Polystyrene content (% w/w) | 20 | 25 | 30 | 35 | 40 | 45 | 50 | 55 |
|---|---|---|---|---|---|---|---|---|
| Final mix temperature (°C) | 144 | 145 | 144 | 142 | 140 | 144 | 141 | 140 |
| Grafting efficiency (%) | 61 | 60 | 59 | 60 | 57 | 60 | 60 | 61 |
| M100 (MPa) | 0.11 | 0.21 | 0.58 | 1.40 | 2.16 | 3.64 | 5.91 | — |
| M300 (MPa) | 0.16 | 0.62 | 1.42 | 2.79 | 3.44 | 4.78 | 6.08 | — |
| M500 (MPa) | 0.23 | 1.18 | 2.72 | 4.66 | 5.53 | 7.43 | — | — |
| Tensile strength (MPa) | 0.23 | 2.66 | 4.26 | 5.74 | 6.50 | 8.09 | 8.88 | 8.30 |
| Elongation at break (%) | 544 | 863 | 747 | 628 | 610 | 547 | 509 | <100 |

EXAMPLE 16

As for Example 6, using Cariflex IR305 synthetic polyisoprene instead of natural rubber. These preparations are summarised in Table XIII.

Table XIII

Graft copolymers of Cariflex IR305 polyisoprene with polystyrene of $\overline{M}n$ 17700

| Polystyrene content (% w/w) | 20 | 25 | 30 | 35 | 40 | 45 | 50 | 55 |
|---|---|---|---|---|---|---|---|---|
| Final mix temperature (°C) | 157 | 154 | 160 | 163 | 162 | 165 | 164 | 162 |
| Grafting efficiency (%) | 68 | 67 | 64 | 66 | 62 | 62 | 53 | 54 |
| M100 (MPa) | <0.2 | 0.26 | 0.65 | 1.64 | 2.72 | 3.85 | 6.31 | — |
| M300 (MPa) | <0.2 | — | — | — | — | — | — | — |
| M500 (MPa) | <0.2 | — | — | — | — | — | — | — |
| Tensile strength (MPa) | 0.22 | 1.04 | 1.81 | 3.56 | 4.46 | 5.41 | 7.80 | 8.22 |
| Elongation at break (%) | 405 | 303 | 288 | 233 | 183 | 192 | 200 | 98 |

EXAMPLE 17

As for Example 14, using Natsyn 2200 synthetic polyisoprene. The polystyrene content of the mix was 40% by weight. The final mix temperature was 157° C. and the grafting efficiency was 41%. Tensile testing gave M100, 2.3 MPa; M300, 6.2 MPa; M500, 14.0 MPa; Tensile strength, 15.3 MPa; with the elongation at break 529%.

EXAMPLE 18

As for Example 2, using Intene 55NF polybutadiene instead of natural rubber. The preparations are summarised in Table XIV.

Table XIV

| Graft copolymers of Intene 55NF polybutadiene with polystyrene of $\overline{M}n$ 5450 | | | | |
|---|---|---|---|---|
| Polystyrene content (% w/w) | 20 | 30 | 40 | 50 |
| Final mix temperature (°C.) | 147 | 146 | 146 | 140 |
| Grafting efficiency (%) | 74 | 76 | 71 | 63 |
| M100 (MPa) | 0.17 | 1.29 | 3.35 | 5.55 |
| M300 (MPa) | 1.24 | 2.59 | 5.79 | 7.90 |
| M500 (MPa) | 1.75 | 3.53 | 7.63 | 10.7 |
| Tensile strength (MPa) | 2.36 | 5.91 | 10.8 | 15.0 |
| Elongation at break (%) | 845 | 1122 | 817 | 747 |

EXAMPLE 19

As for Example 18, using polystyrene of $\overline{M}n$ 8500 having 75% of the polymer chains terminated with azodicarboxylate end groups. The preparations are summarised in Table XV.

Table XV

| Graft copolymers of Intene 55NF polybutadiene with polystyrene of $\overline{M}n$ 8500 | | | |
|---|---|---|---|
| Polystyrene content (% w/w) | 20 | 30 | 40 |
| Final mix temperature (°C.) | 152 | 147 | 148 |
| Grafting efficiency (%) | 66 | 56 | 52 |
| M100 (MPa) | 1.07 | 1.70 | 3.38 |
| M300 (MPa) | 2.36 | 3.42 | 5.46 |
| M500 (MPa) | — | — | 7.16 |
| Tensile strength (MPa) | 2.30 | 4.14 | 7.56 |
| Elongation at break (%) | 315 | 486 | 579 |

EXAMPLE 20

As for Example 19, using Europrene-cis polybutadiene. The polystyrene content of the mix was 40% by weight. The mixer was heated initially to 110° C. and the mixing was continued for 15 min. at 150 r.p.m. The final mix temperature was 149° C. and the grafting efficiency was 41%. Tensile testing gave M100, 1.89 MPa; M300, 3.5 MPa; Tensile strength, 3.9 MPa; with the elongation at break 369%.

EXAMPLE 21

As for Example 19, using Intol 1500 styrene-butadiene copolymer instead of Intene 55NF polybutadiene. The preparations are summarised in Table XVI.

Table XVI

| Graft copolymers of Intol 1500 styrene-butadiene copolymer and polystyrene of $\overline{M}n$ 8500 | | | | | | |
|---|---|---|---|---|---|---|
| Polystyrene content (% w/w) | 20 | 25 | 30 | 35 | 40 | 45 |
| Final mix temperature (°C.) | 146 | 147 | 142 | 140 | 135 | 144 |
| Grafting efficiency (%) | 61 | 64 | 64 | 60 | 65 | 65 |
| M100 (MPa) | 1.02 | 1.74 | 2.73 | 3.60 | 4.68 | 6.11 |
| M300 (MPa) | 2.55 | 4.03 | 5.22 | 6.02 | 7.18 | 8.48 |
| M500 (MPa) | 3.34 | 5.10 | 6.62 | 8.11 | 10.4 | 12.4 |
| Tensile strength (MPa) | 3.85 | 6.69 | 8.60 | 11.5 | 15.2 | 16.8 |
| Elongation at break (%) | 929 | 900 | 742 | 761 | 696 | 642 |

EXAMPLE 22

As for Example 1, using Breon 1041 acrylonitrile-butadiene copolymer instead of natural rubber. The polystyrene content of the mix was 40% by weight. The mixing time was extended to 20 min. The final mix temperature was 160° C. and the grafting efficiency was 66%. Tensile testing gave M100, 7.8 MPa; M300, 10.0 MPa; Tensile strength 13.1 MPa; with the elongation at break 444%.

EXAMPLE 23

As for Example 1, using Neoprene AD20 polychloroprene instead of natural rubber. The polystyrene content of the mix was 40% by weight. The mixing time was extended to 15 min. The final mix temperature was 128° C. and the grafting efficiency was 45%. Tensile testing gave M100, 0.87 MPa; M300, 2.18 MPa; M500, 3.66 MPa; Tensile strength, 6.54 MPa; with the elongation at break 800%.

EXAMPLE 24

Cariflex IR305 synthetic polyisoprene was mixed with polystyrene of $\overline{M}n$ 8200 having no terminal azodicarboxylate end group, under the conditions described for Example 1. The polystyrene content of the mix was 40% by weight. The product was opaque and a compression moulded sheet had a tensile strength of <0.5 MPa. This example demonstrates that a simple blend of polystyrene and rubber is a very weak material, even when the blend is prepared under conditions of high shear.

EXAMPLE 25

Cariflex IR305 synthetic polyisoprene was blended with polystyrene of $\overline{M}n$ 8200, having 72% of the polymer chains terminated with azodicarboxylate functional groups, on a two-roll mill at 50° C. The polystyrene content of the mix was 40% by weight. A sample of the mix was pressed at 150° C. to give a sheet 0.5 mm thick and was maintained at 150° C. for 15 min. The final sheet was opaque and had a tensile strength of <0.5 MPa. This example demonstrates that static heating of a mix prepared under low shear conditions is not sufficient to achieve grafting and develop strength in the material.

EXAMPLE 26

A series of mixes were prepared as in Example 13 with mixing times of 4, 6, 8 and 10 min. The polystyrene content of the mixes was 40% by weight. Samples of the mixes were analysed for grafting efficiency by gel permeation chromatography, then sheets were prepared by compression moulding as described in Example 1. Samples of the moulded sheets were analysed for grafting efficiency and the sheets were tested for modulus and tensile strength under the standard conditions. The results are summarised in Table XVII. This example demonstrates that, provided the grafting reaction is initiated and allowed to proceed to some extent under high shear conditions, the remainder of the reaction can be completed by a subsequent high-temperature handling step, e.g. by compression moulding.

Table XVII

Graft copolymers of Cariflex IR305 polyisoprene and polystyrene of $\overline{M}n$ 8200

| | | | | |
|---|---|---|---|---|
| Mixing time (min) | 4 | 6 | 8 | 10 |
| Final mix temperature (°C.) | 133 | 136 | 136 | 143 |
| Grafting efficiency of mix (%) | 39 | 70 | 77 | 76 |
| Grafting efficiency in moulded sheet (%) | 72 | 75 | 77 | 76 |
| M100 (MPa) | 3.71 | 3.11 | 2.97 | 2.39 |
| M300 (MPa) | 8.48 | 6.55 | 5.84 | 4.41 |
| M500 (MPa) | 13.9 | 12.8 | 11.3 | 8.40 |
| Tensile strength (MPa) | 15.1 | 18.9 | 17.4 | 14.5 |
| Elongation at break (%) | 562 | 660 | 678 | 717 |

EXAMPLE 27

A series of mixes were prepared as in Example 13 at mixing speeds of 75, 105 and 150 r.p.m. The polystyrene content of the mixes was 40% by weight. Samples of the mixes were analysed for grafting efficiency by gel permeation chromatography, then sheets were prepared by compression moulding as described in Example 1. Samples of the moulded sheets were analysed for grafting efficiency and the sheets were tested for modulus and tensile strength under the standard conditions. The results are summarised in Table XVIII. This example demonstrates that a decrease in the severity of mixing results in a decrease in grafting efficiency at a given mixing time but provided some degree of grafting has been initiated the grafting reaction can proceed further during subsequent high temperature handling, e.g. during compression moulding.

Table XVIII

Graft copolymers of Cariflex IR305 polyisoprene and polystyrene of $\overline{M}n$ 8200

| | | | |
|---|---|---|---|
| mixing speed (r.p.m.) | 75 | 105 | 150 |
| Final mix temperature (°C.) | 120 | 133 | 143 |
| Grafting efficiency of mix (%) | 39 | 70 | 76 |
| Grafting efficiency in moulded sheet (%) | 68 | 78 | 76 |
| M100 (MPa) | 3.39 | 2.54 | 2.39 |
| M300 (MPa) | 8.03 | 5.12 | 4.41 |
| M500 (MPa) | 12.4 | 10.1 | 8.40 |
| Tensile strength (MPa) | 12.6 | 15.7 | 14.5 |
| Elongation at break (%) | 490 | 722 | 717 |

We claim:

1. A method of forming a graft copolymer, which method comprises providing a reaction mixture of an ethylenically unsaturated natural or synthetic rubber in the solid state with a pre-polymer having one azodicarboxylate end group reactive towards ethylenically unsaturated groups of the rubber, and maintaining the mixture at an elevated temperature at least equal to the glass transition temperature of the pre-polymer but below the decomposition temperature of the rubber with intimate blending of the reactants, whereby the pre-polymer molecules react with and become attached to the rubber molecule backbone.

2. A method as claimed in claim 1, characterized in that the pre-polymer is a poly(vinyl aromatic monomer).

3. A method as claimed in claim 1 or 2, characterized in that the rubber is natural rubber.

4. A method as claimed in claim 1 or 2, characterized in that the rubber is selected from styrene-butadiene copolymers, acrylonitrile-butadiene copolymers, polyisoprene, polybutadiene and polychloroprene.

5. A method as claimed in claim 1 or 2, characterized in that the pre-polymer is polystyrene having a number average molecular weight of from 3,000 to 15,000 and a glass transition temperature of from 70° to 95° C.

6. A method as claimed in claim 1 or 2, characterized in that the reaction mixture contains from 40 to 90% by weight of the rubber and correspondingly from 60 to 10% by weight of the pre-polymer based on the weight of the two reactants.

7. The method as claimed in claim 1 or 2, characterized in that the reactants are intimately blended in an internal mixer.

8. A method as claimed in claim 1 or 2, wherein intimate blending is continued for at least 60% of the reaction.

9. A thermoplastic graft copolymer prepared by the method of claim 1 or 2, having a backbone derived from an ethylenically unsaturated natural or synthetic rubber and side chains of a poly (vinyl aromatic monomer) and having the properties:

| | |
|---|---|
| M100 | 0.1 to 8 MPa |
| Tensile strength | 4 to 30 MPa |
| Elongation at Break | more than 200% |

* * * * *